United States Patent [19]

Arai

[11] Patent Number: 5,721,969
[45] Date of Patent: Feb. 24, 1998

[54] MECHANISM FOR DRIVING A BLUR CORRECTING LENS IN A BLURRED IMAGE CORRECTING APPARATUS OF A CAMERA

[75] Inventor: Masayuki Arai, Tokyo, Japan

[73] Assignee: Asahi Seimitsu Kabushiki Kaisha, Tokyo, Japan

[21] Appl. No.: 676,685

[22] Filed: Jul. 10, 1996

[30] Foreign Application Priority Data

Feb. 27, 1996 [JP] Japan ................................. 8-039350

[51] Int. Cl.$^6$ ................................................ G03B 17/00
[52] U.S. Cl. ............................................................. 396/55
[58] Field of Search ................................. 336/55; 396/52, 396/53, 54

[56] References Cited

U.S. PATENT DOCUMENTS

| | | | |
|---|---|---|---|
| 4,864,339 | 9/1989 | Gross et al. | 354/202 |
| 4,996,545 | 2/1991 | Enomoto et al. | 354/70 |
| 5,039,211 | 8/1991 | Maruyama | 359/557 |
| 5,150,150 | 9/1992 | Enomoto | 354/456 |
| 5,172,276 | 12/1992 | Ueyama et al. | 359/813 |
| 5,181,056 | 1/1993 | Noguchi et al. | 354/70 |
| 5,266,988 | 11/1993 | Washisu | 354/70 |
| 5,280,387 | 1/1994 | Maruyama | 359/554 |
| 5,305,040 | 4/1994 | Enomoto | 354/202 |
| 5,335,032 | 8/1994 | Onuki et al. | 354/195.1 |
| 5,337,098 | 8/1994 | Imafuji et al. | 354/70 |
| 5,365,304 | 11/1994 | Hamada et al. | 354/430 |
| 5,416,558 | 5/1995 | Katayama et al. | 354/446 |
| 5,444,512 | 8/1995 | Morizumi | 354/430 |
| 5,541,693 | 7/1996 | Enomoto | 354/202 |
| 5,617,159 | 4/1997 | Sakagami et al. | 396/55 |
| 5,619,735 | 4/1997 | Kai | 396/55 |

FOREIGN PATENT DOCUMENTS 0504930  9/1992  European Pat. Off. ........ G02B 27/64

OTHER PUBLICATIONS

One United Kingdom Search Report.

*Primary Examiner*—Safet Metjahic
*Assistant Examiner*—Christopher E. Mahoney
*Attorney, Agent, or Firm*—Greenblum & Bernstein, P.L.C.

[57] ABSTRACT

A mechanism for driving a blur correcting lens in a camera in orthogonal directions to nullify a blur of an image in accordance with a movement of a camera. The mechanism includes a first linear movement member that is movable in a direction substantially perpendicular to a photographing optical axis. A second linear movement member is provided that is supported on the first linear movement member to move in a direction substantially perpendicular to the direction of movement of the first linear movement member. A first drive motor is provided with a first rotatable drive lever to move the first linear movement member, while a second drive motor is provided with a second rotatable drive lever to move the second linear movement member.

15 Claims, 3 Drawing Sheets

MECHANISM FOR DRIVING A BLUR CORRECTING LENS IN A BLURRED IMAGE CORRECTING APPARATUS OF A CAMERA

BACKGROUND OF THE INVENTION

1. Field of the Invention

The present invention relates to an apparatus for correcting a blurred image on an imaging surface (film surface), caused by a movement of the optical axis of a photographing optical system of a camera, and in particular relates to a mechanism for driving a blur correcting lens thereof.

2. Description of the Related Art

In an apparatus for correcting a blurred image of a camera, when camera-shake, i.e., camera movement, occurs causing the optical axis of a photographing lens to move, the amount of camera-shake, which is represented by an angular velocity or an angular acceleration applied to the camera, is detected, so that a blur correcting lens is moved in a direction opposite to the direction of the camera movement, in accordance with the angular velocity or angular acceleration, to nullify the camera movement to thereby eliminate the occurrence of blurring.

Conventional blur correcting apparatuses have been applied mainly to portable still cameras. However the same problem, i.e., blurring of an image, also occurs in monitoring cameras. Namely, if a monitoring camera is shaken or moved, the picked-up images streak, and hence no monitoring function can be achieved.

SUMMARY OF THE INVENTION

It is an object of the present invention to provide a simple driving mechanism for a blur correcting lens used in a blur correcting apparatus of a camera, wherein the blur correcting lens can be correctly and quickly moved in accordance with an amount of camera-shake.

To achieve the object mentioned above, according to an aspect of the present invention, there is provided a mechanism for driving a blur correcting lens in a blurred image correcting apparatus of a camera, in which the blur correcting lens is movable in two orthogonal directions to nullify blurring of an image in accordance with a movement of a camera. The mechanism has a first linear movement member, linearly movable in a direction substantially perpendicular to a photographing optical axis, a second linear movement member, supported on the first linear movement member to linearly move in a direction substantially perpendicular to the direction of movement of the first linear movement member, a first drive motor, provided with a first rotatable drive lever to linearly move the first linear movement member, and a second drive motor, provided with a second rotatable drive lever to linearly move the second linear movement member.

The association mechanism of the linear movement members with the corresponding drive motors can be realized as follows: either the first linear movement member or the first drive lever is provided with a first elongated hole which extends in a direction substantially perpendicular to the direction of movement of the first linear movement member, while the other of the first linear movement member or the first drive lever (which is not provided with the first elongated hole) is provided with a first drive pin which is fitted in the first elongated hole. Either the second linear movement member or the second drive lever is provided with a second elongated hole which extends in a direction substantially perpendicular to the direction of movement of the second linear movement member, while the other of the second linear movement member or the second drive lever (which is not provided with the second elongated hole) is provided with a second drive pin which is fitted in the second elongated hole. The first and second drive levers of the first and second drive motors respectively extend along the first and second elongated holes, when the drive meters are not activated.

The first and second drive motors may comprise rotary magnets, which are formed integral with the rotating shafts of the respective drive levers, and drive coils surrounding the rotary magnets.

According to another aspect of the present invention, a blurred image correcting apparatus of a camera is provided, having a stationary frame member, first and second linear movement members, first and second drive motors and means for actuating the same in accordance with an angular velocity applied to the camera. The first linear movement member is supported on the stationary frame member to linearly move in a direction substantially perpendicular to a photographing optical axis of the camera. The first linear movement member has a hole through which photographing light of the camera passes. The second linear movement member is supported on the first linear movement member to linearly move in a direction substantially perpendicular to the direction of movement of the first linear movement member. The second linear movement member supports a blur correcting lens through which the photographing light of the camera passes. The first drive motor is secured to the stationary frame member, and is provided with a first rotating shaft and a first rotatable drive lever fixed to the rotating shaft to linearly move the first linear movement member. The second drive motors is secured to the stationary frame member, and is provided with a second rotating shaft and a second rotatable drive lever fixed to the second rotating shaft to linearly move the second linear movement member.

Preferably, the first and second drive motors respectively consist of rotary magnets, which are formed integral with the rotating shafts of the respective drive levers, and drive coils which are secured to the stationary frame member and surround the rotary magnets.

The present disclosure relates to subject matter contained in the Japanese Patent Application No. 08-39350 (filed on Feb. 27, 1996) which is expressly incorporated herein by reference in its entirety.

BRIEF DESCRIPTION OF THE DRAWINGS

The invention will be described below in detail with reference to the accompanying drawings, in which like elements are indicated by like reference numerals, and wherein.

DESCRIPTION OF THE PREFERRED EMBODIMENT

Figure 1:
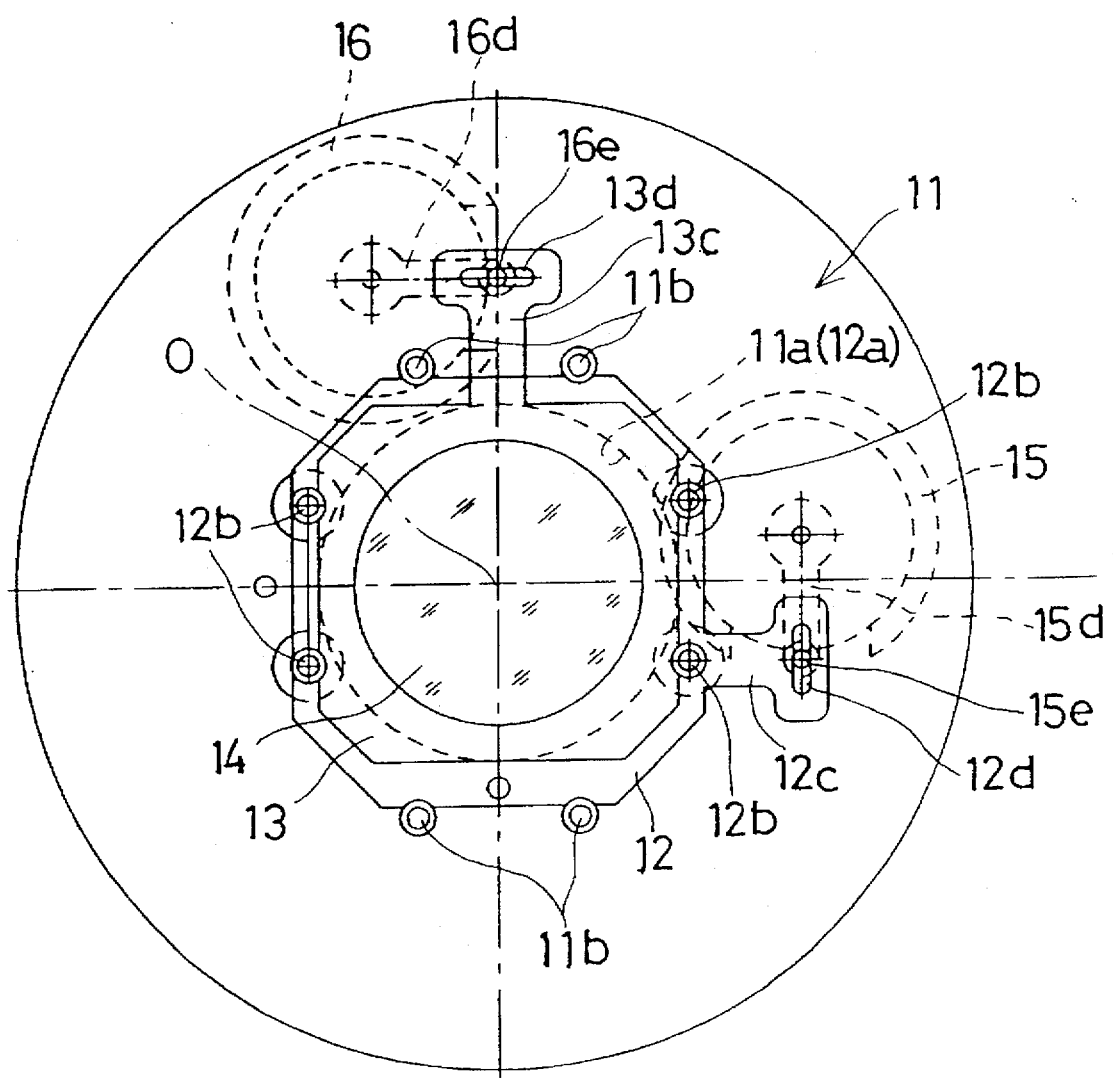
FIG. 1 is a front elevational view of an embodiment of a blur correcting lens driving mechanism in a blur correcting apparatus of a camera, according to the present invention.

FIG. 1 shows a stationary frame member 11, secured in a lens barrel (not shown), provided with a hole 11a having a center located on a photographing optical axis O, through which photographing light passes. Two pairs of guide rollers 11b are disposed on upper and lower sides of the hole 11a.

The guide rollers 11b support a first linear movement frame 12 to move in right and left directions (lateral direction), as viewed in FIG. 1.

The first linear movement frame 12 has a center opening 12a similar to the hole 11a of the stationary frame member 11, so that photographing light passes through the center opening 12a. Two pairs of guide rollers 12b are provided on right and left sides, as viewed in FIG. 1, of the center opening 12a of the first linear movement frame to support a second linear movement frame 13 to move in the vertical direction on the first linear movement frame 12. The second linear movement frame 13 holds, at a center portion thereof, a correcting lens 14. Consequently, the correcting lens 14 can be moved in orthogonal directions, i.e., lateral and vertical directions, in accordance with a linear movement of the first linear movement frame 12 and/or the second linear movement frame 13.

The first linear movement frame 12 is provided with a drive arm (first drive arm) 12c extending therefrom in the direction of movement of the first linear movement frame 12. The first drive arm 12c is provided on a front end thereof with an elongated driving hole (first elongated driving hole) 12d which extends in a direction substantially perpendicular to the direction of movement of the first linear movement frame 12.

The second linear movement frame 13 is provided with a drive arm (second drive arm) 13c extending therefrom in the direction of movement of the second linear movement frame 13. The second drive arm 13c is provided on a front end thereof with an elongated driving hole (second elongated driving hole) 13d which extends in a direction substantially perpendicular to the direction of movement of the second linear movement frame 13.

Secured to the stationary frame member 11 are first and second drive motor 15 and 16, which are respectively provided for the first and second linear movement frames 12 and 13. The first and second drive motors 15 and 16 are identical and are constructed as shown in FIG. 3.

Figure 2:
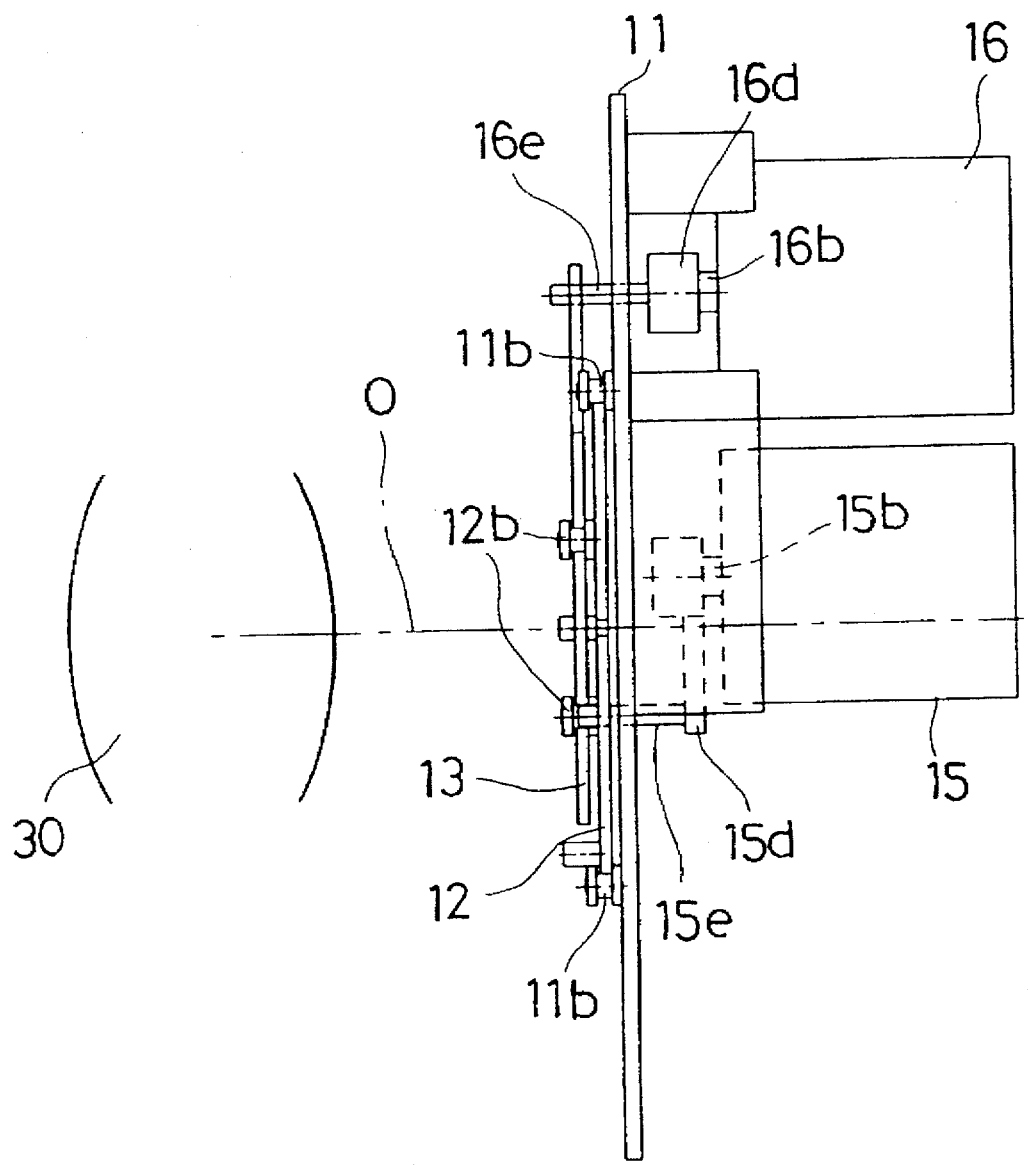
FIG. 2 is a side elevational view of FIG. 1.
Figure 3:
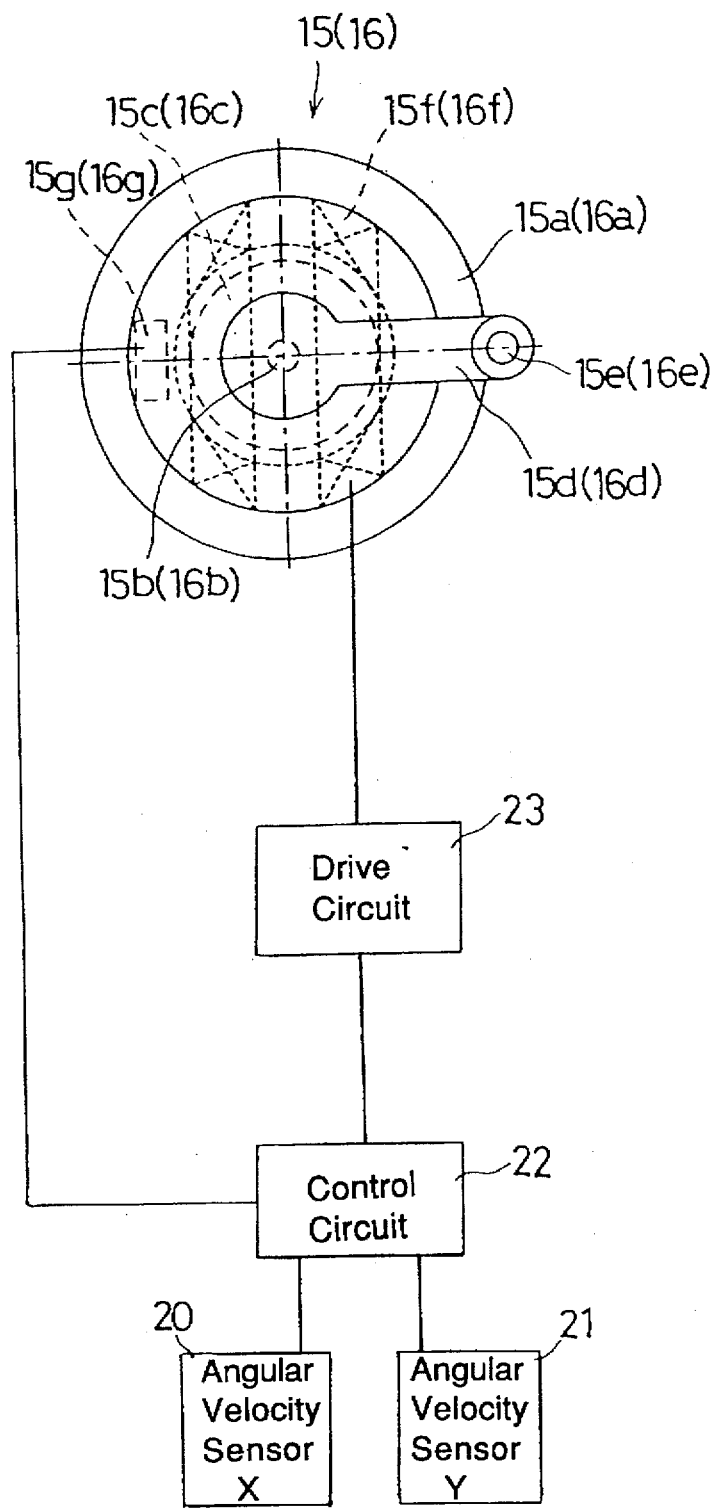
FIG. 3 is a front elevational view of a drive meter shown in FIGS. 1 and 2.

As shown in FIG. 3, a cylindrical yoke 15a (16a) is provided with a rotating shaft 15b (16b) to which a rotary magnet 15c (16c), provided in the cylindrical yoke 15a (16a), is secured. A first drive lever 15d (second drive lever 16d) is secured to the rotating shaft 15b (16b) outside the cylindrical yoke 15a (16a), as shown in FIG. 2. The first drive lever 15d (16d) is provided on its front end with a drive pin 15e (16e) secured thereto. A drive coil 15f (16f) is secured in the cylindrical yoke 15a (16a) to constitute a magnetic drive circuit together with the rotary magnet 15c (16c). The direction of rotation and the angular displacement of the rotary magnet 15c (16c), i.e., the direction of rotation and the angular displacement of the first drive lever 15d (second drive lever 16d), are controlled by controlling the direction and amount of current to be supplied to the drive coil 15f (16f). A position sensor (e.g., Hall element) 15g (16g) is secured in the cylindrical yoke 15a (16a) to detect the angular position of the first drive lever 15d (second drive lever 16d).

The first drive motor 15 is secured to the stationary frame member 11 so that the first drive lever 15d, when the drive motor 15 is not actuated, extends on and along the first elongated driving hole 12d of the first linear movement frame 12. The drive pin 15e is fitted in the first elongated driving hole 12d. Similarly, the second drive motor 16 is secured to the stationary frame member 11 so that the second drive lever 16d, when the drive motor 16 is not actuated, extends on and along the second elongated driving hole 13d of the second linear movement frame 13. The drive pin 16e is fitted in the second elongated driving hole 13d.

Outputs of angular velocity sensors 20 and 21, provided in the camera body (not shown) are supplied to a control circuit 22 to detect the angular velocity in the orthogonal directions respectively. Control circuit 22 controls the amount of current to be supplied to the drive coil 15f (16f) through a drive circuit 23, in accordance with the outputs of the angular velocity sensors 20 and 21. Position data supplied from the position sensor 15g (16g) is fed back to the control circuit 22.

For example, the apparatus of the present embodiment as constructed above is arranged behind a main photographing optical system 30, as shown in FIG. 2, so that the first linear movement frame 12 moves in the horizontal direction, and the second linear movement frame 13 moves in the vertical direction, as viewed in FIG. 1, respectively. The drive coil 15f is supplied with an electric current, through the control circuit 22 and the drive circuit 23, to rotate the first drive lever 15d, in accordance with the amount and direction of the horizontal component of the oscillation applied to the camera (optical axis), detected by the angular velocity sensor 20. Consequently, the first linear movement frame 12, and accordingly the correcting lens 14, is linearly moved in a horizontal direction to nullify the horizontal movement of the image due to the oscillation, through the drive pin 15e and the first elongated driving hole 12d. Namely, since the second linear movement frame 13 is held on the first linear movement frame 12, and the correcting lens 14 is secured to the second linear movement frame 13, the correcting lens 14 is moved in the horizontal direction together with the first linear movement frame 12.

Similarly, the drive coil 16f is supplied with an electric current, through the control circuit 22 and the drive circuit 23, to rotate the second drive lever 16d, in accordance with the amount and direction of the vertical component of the oscillation detected by the angular velocity sensor 21. Consequently, the second linear movement frame 13, and accordingly, the correcting lens 14, is linearly moved in a direction to nullify the vertical movement of the image due to the oscillation, through the drive pin 16e and the second elongated driving hole 13d. The movement of the second linear movement frame 13 (correcting lens 14) takes place without causing a movement of the first linear movement frame 12.

In the operation mentioned above, since the first drive lever 15d (second drive lever 16d) rotates, and the first linear movement frame 12 (second linear movement frame 13) moves linearly, the members to be moved can be made small and light in comparison with an arrangement in which the first linear movement frame 12 (second linear movement frame 13) is moved, for example, by a linear motor. Thus, the drive mechanism can be made small as a whole and can respond quickly to a movement. Moreover, it is possible to increase the resonant frequency of the first and second linear movement frames 12 and 13 in order to make the operation stable. Furthermore, since the elongated driving hole 12d (13d) does not transmit the oscillation of the drive pin 15e (16e) in the longitudinal direction thereof to the linear movement frame 12 (13) in the embodiment, the correcting lens 14 is less influenced by the oscillation. In other words, the oscillation of the linear movement frames 12 and 13 tends to impart little or no influence on the drive meters 15 and 16. The drive motors 15 and 16, consisting of the rotary magnets, have an increased durability.

Although the drive levers of the drive motors are rotated by the drive pins and the elongated holes in the illustrated embodiment, it is possible to bias the linear movement frames 12, 13 so that the drive pins 15e, 16e of the drive levers 15, 16 continuously bear against end surfaces of the linear movement frames 12, 13 so as to transmit the movement to the linear movement frames.

Although in the above-mentioned embodiment, the first linear movement frame 12 is moved in the lateral direction of the camera and the second linear movement frame 13 is moved in the vertical direction, the direction of the arrangement is not limited thereto. Namely, the outputs of the angular velocity sensors 20 and 21 are processed such that the first and second drive motors 15 and 16 are controlled to correct a blurred image, in accordance with the direction of the arrangement. Note that the present invention can be applied not only to a monitoring camera, but also to a portable still camera.

As can be seen from the above discussion, according to the present invention, since the correcting lens is moved in substantially orthogonal directions by linear movements of the first and second linear movement frames, caused by the rotational movement of the drive levers of the first and second drive motors, a simple correcting lens driving mechanism, which can be driven by a small power, can be provided. In particular, if the association mechanism of the drive levers with the linear movement frames is constituted by the drive pins and the elongated holes, in which the drive pins are fitted, an oscillation can be effectively absorbed. Moreover, if rotary magnet type drive motors are used, a high durability can be obtained.

What is claimed is:

1. A mechanism for driving a blur correcting lens in a blurred image correcting apparatus of a camera, in which said blur correcting lens is movable in two orthogonal directions to nullify blurring of an image in accordance with a movement of a camera, comprising:

a first linear movement member which is linearly movable in a direction substantially perpendicular to a photographing optical axis of said camera;

a second linear movement member which is supported on said first linear movement member to linearly move in a direction substantially perpendicular to said direction of movement of said first linear movement member, said second linear movement member being provided with the blur correcting lens;

a first driver motor provided with a rotating shaft and a first rotatable drive lever fixed to said rotating shaft, to linearly move said first linear movement member; and a second drive motor provided with a second rotating shaft and a second rotatable drive lever fixed to said second rotating shaft, to linearly move said second linear movement member, wherein one of said first linear movement member and said first drive lever is provided with a first elongated hole which extends in a direction substantially perpendicular to said direction of movement of said first linear movement member, and an other of said first linear movement member and said first drive lever which is not provided with said first elongated hole, is provided with a first drive pin which is fitted in said first elongated hole, one of said second linear movement member and said second drive lever being provided with a second elongated hole which extends in a direction substantially perpendicular to said direction of movement of said second linear movement member, and an other of said second linear movement member and said second drive lever which is not provided with said second elongated hole, is provided with a second drive pin which is fitted in said second elongated hole.

2. The driving mechanism according to claim 1, wherein said first and second drive levers of said first and second drive motors, respectively, extend along said first and second elongated holes when said drive motors are not activated.

3. The driving mechanism according to claim 1, wherein said first and second drive motors, respectively, comprise rotary magnets, which are formed integral with said rotating shafts of said drive levers, respectively, and drive coils surrounding said rotary magnets.

4. The mechanism of claim 1, wherein a rotational direction of said first drive motor is in a same direction as a rotational direction of said second drive motor.

5. The mechanism of claim 1, further comprising:

a stationary frame member, said first drive motor and said second drive motor being positioned behind said stationary frame member.

6. A blurred image correcting apparatus of a camera, comprising:

a stationary frame member;

a first linear movement member supported on said stationary frame member to linearly move in a direction substantially perpendicular to a photographing optical axis of the camera, said first linear movement member having a hole through which photographing light of the camera passes;

a second linear movement member supported on said first linear movement member, to linearly move in a direction substantially perpendicular to said direction of movement of said first linear movement member, said second linear movement member supporting a blur correcting lens through which the photographing light of the camera passes;

a first drive motor secured to said stationary frame member, said first drive motor being provided with a first rotating shaft and a first rotatable drive lever fixed to said rotating shaft to linearly move said first linear movement member;

a second drive motor secured to said stationary frame member, said second drive motor being provided with a second rotating shaft and a second rotatable drive lever fixed to said second rotating shaft to linearly move said second linear movement member; and means for actuating said first and second drive motors in accordance with an angular velocity applied to said camera, wherein one of said first linear movement member and said first drive lever is provided with a first elongated hole which extends in a direction substantially perpendicular to said direction of movement of said first linear movement member, and an other of said first linear movement member and said first drive lever which is not provided with said first elongated hole, is provided with a first drive pin which is fitted in said first elongated hole, one of said second linear movement member and said second drive lever being provided with a second elongated hole which extends in a direction substantially perpendicular to said direction of movement of said second linear movement member, and an other of said second linear movement member and said second drive lever which is not provided with said second elongated hole, is provided with a second drive pin which is fitted in said second elongated hole.

7. The driving mechanism according to claim 6, wherein said first and second drive motors, respectively, comprise rotary magnets, which are formed integral with said rotating shafts of said drive levers, respectively and drive coils which are secured to said stationary frame member and surround said rotary magnets.

8. The blurred image correcting apparatus of claim 6, wherein a rotational direction of said first drive motor is in a same direction as a rotational direction of said second drive motor.

9. The blurred image correcting apparatus of claim 6, wherein said first drive motor and said second drive motor are secured to a rear portion of said stationary frame member.

10. A blur correcting mechanism having a blur correcting lens movable in two orthogonal directions to nullify a blurting of an image, comprising:

a first member which is linearly translatable in a direction substantially perpendicular to a photographing optical axis of said camera;

a second member supported on said first member to linearly translate in a direction substantially perpendicular to said direction of translation of said first member, the blur correcting lens being mounted to said second member;

a first motor to linearly translate said first member, said first motor having a first drive lever;

a second motor to linearly translate said second member, said second motor having a second drive lever; and a guide system that guides said first member and said second member to translate in directions substantially perpendicular to each other, wherein one of said first member and said first drive lever is provided with a first aperture extending in a direction substantially perpendicular to said direction of movement of said first member, and an other of said first member and said first drive lever which is not provided with said first aperture being provided with a first drive pin which is fitted in said first aperture, one of said second member and said second drive lever is provided with a second aperture extending in a direction substantially perpendicular to said direction of movement of said second member, and an other of said second member and said second drive lever which is not provided with said second aperture being provided with a second drive pin which is fitted in said second aperture.

11. The blur correcting mechanism of claim 10, wherein said blur correcting mechanism is incorporated in a camera.

12. The blur correcting mechanism of claim 10, wherein said first motor and said second motor each comprise:

a rotary shaft;

a rotary magnet formed integral with said rotating shaft;

a drive coil that surrounds said rotary magnet.

13. The blur correcting mechanism of claim 12, wherein each of said first motor and said second motor further comprise:

a sensor that detects an angular position of said rotary magnet.

14. The blur correcting mechanism of claim 10, wherein said first member is provided with a first drive arm and said second member is provided with a second drive arm, said first drive arm having a first elongated opening extending in a direction substantially perpendicular to the translation direction of movement of said first member, said second drive arm having a second elongated opening extending in a direction substantially perpendicular to a translation direction of said second member.

15. The blur correcting mechanism of claim 10, said first member being mounted for translation with respect to a fixed member.

* * * * *